F. N. MOREY.
MACHINE FOR DRYING AND STRAIGHTENING VENEER.
APPLICATION FILED AUG. 21, 1909.
947,306.
Patented Jan. 25, 1910.
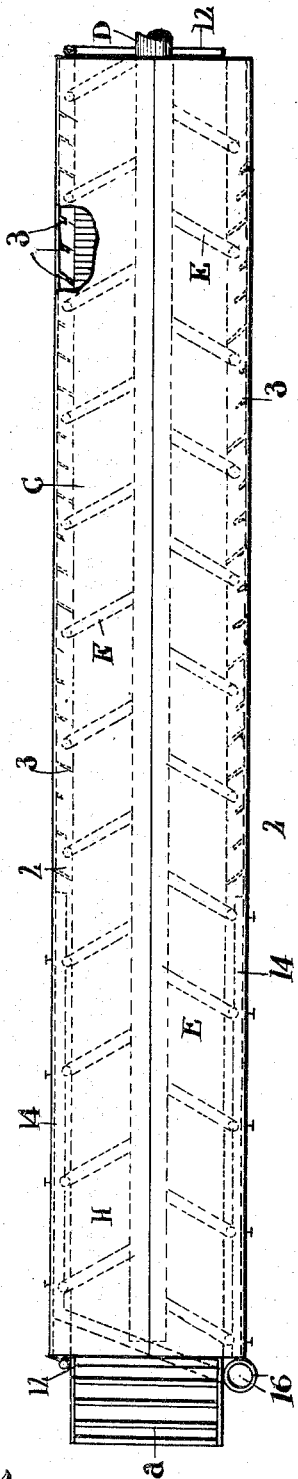
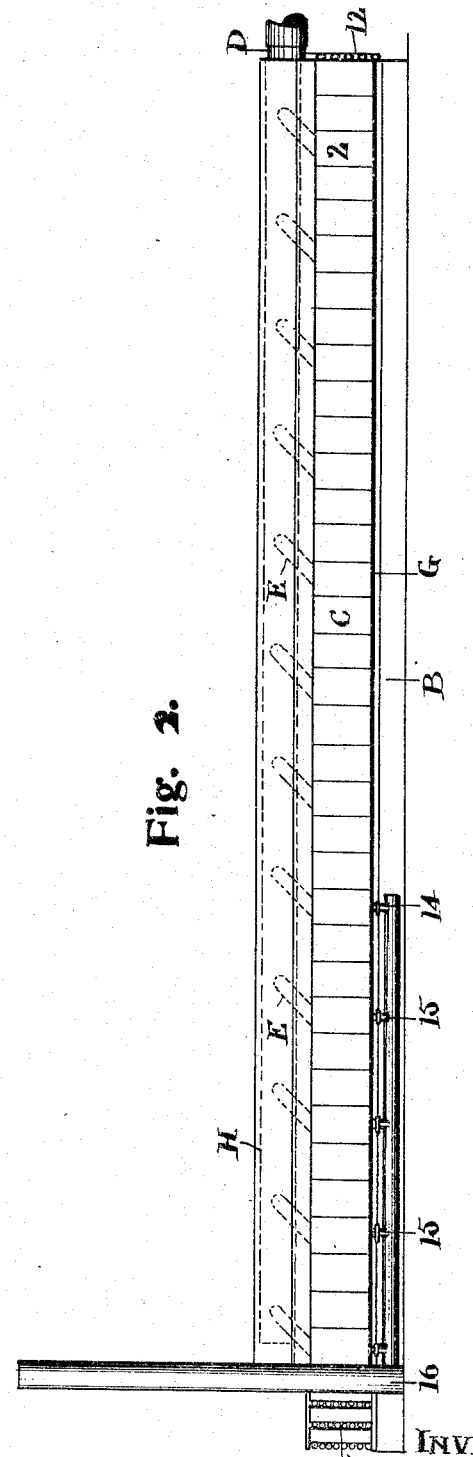

F. N. MOREY.
MACHINE FOR DRYING AND STRAIGHTENING VENEER.
APPLICATION FILED AUG. 21, 1909.

947,306.

Patented Jan. 25, 1910.

3 SHEETS—SHEET 3.

ATTEST
E. M. Fisher
F. C. Museum

INVENTOR
FRANK N. MOREY.
BY Fisher & Ulbert ATTYS.

UNITED STATES PATENT OFFICE.

FRANK N. MOREY, OF PAINESVILLE, OHIO.

MACHINE FOR DRYING AND STRAIGHTENING VENEER.

947,306.  Specification of Letters Patent.  Patented Jan. 25, 1910.

Application filed August 21, 1909. Serial No. 513,946.

*To all whom it may concern:*

Be it known that I, FRANK N. MOREY, citizen of the United States, residing at Painesville, in the county of Lake and State of Ohio, have invented certain new and useful Improvements in Machines for Drying and Straightening Veneer, of which the following is a specification.

My invention relates to machines for drying and straightening veneer, all substantially as shown and described and particularly pointed out in the claims.

Figure 3:
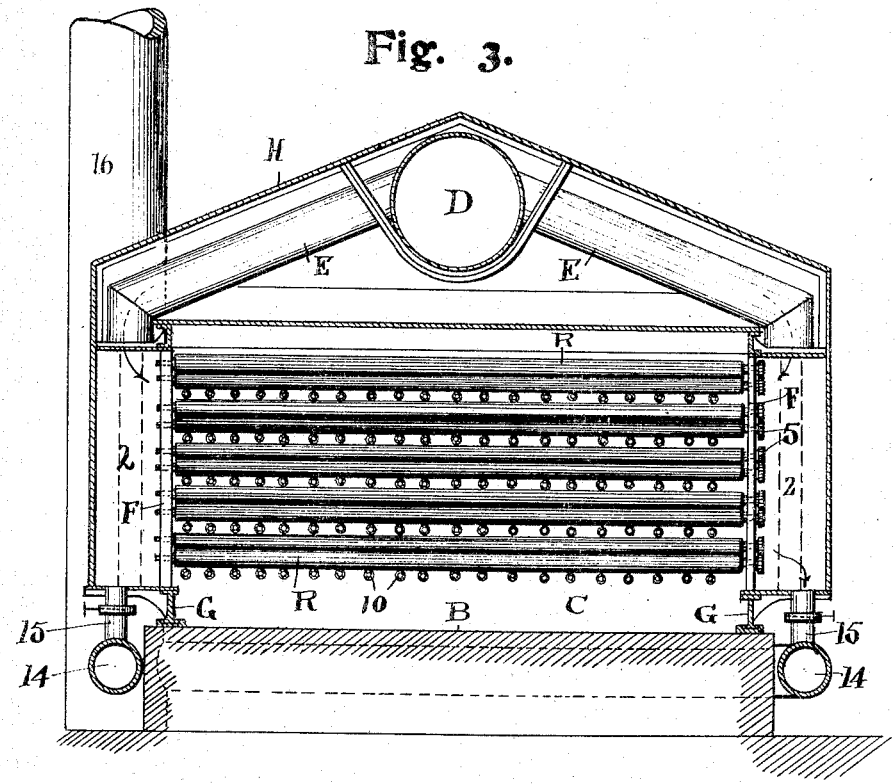
Figure 4:
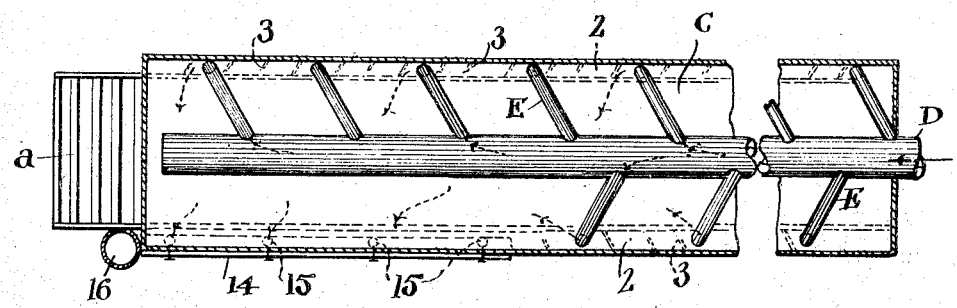
Figure 5:
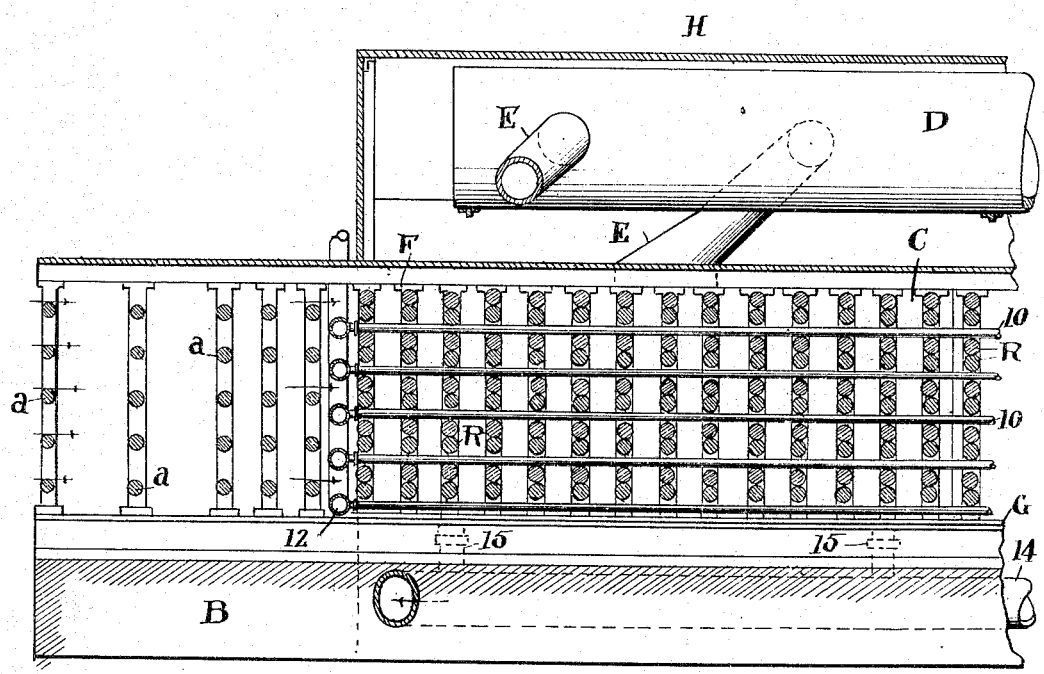
Figure 6:
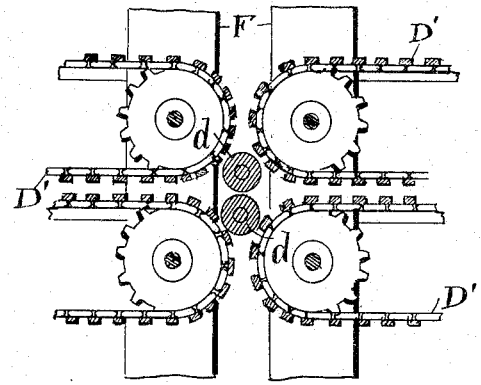

In the accompanying drawings, Figure 1 is a plan view of the machine, and Fig. 2 is a side elevation. Fig. 3 is a relatively enlarged cross section of the machine and Fig. 4 is a sectional plan view corresponding to Fig.1 but broken out between its ends. Fig. 5 is an enlarged vertical sectional elevation lengthwise of one end of the machine, and Fig. 6 is a still more considerably enlarged detail of a modification, as will hereinafter fully appear.

In order to understand the drawings as thus presented it should be known that the machine as a whole is exceedingly large, being one hundred to one hundred and twenty feet or more in length and say about fifteen feet in width and about twelve feet in height, so that at the best the full length views in Figs. 1 and 2 are to be interpreted as in a sense diagrammatic while the sectional views are also materially reduced but are deemed sufficient to disclose the details of construction. Furthermore the present invention is an improvement on my Patent No. 839,868 of January 1, 1907. In the said patent I employed materially different constructions in both the drying chamber and in the operating parts as will appear in the further description of the invention. Thus the present chamber C is built upon a solid base B with channel rails G or their equivalent at the bottom of the casing resting on said base. The wall of the said casing or chamber is preferably constructed from suitable sheet metal and has ventilating spaces 2 at its sides lengthwise for the circulation of air to promote drying the veneer. The said spaces extend the full length and depth of the chamber and are adapted to supply air upon both sides directly to or into the interior of the chamber and in such ample volume as the needs of the drier may require. To this end air is delivered to the drier primarily through a relatively large tube or tunnel D located centrally in the top of the structure over the immediate top wall thereof and just beneath roof H and running the full length thereof, and feed or distributing pipes E at intervals, say of ten feet or so on each side, deliver the air from tube D to the said side air spaces 2. Said spaces are sub-divided at intervals by vertically disposed vanes or plates 3 graduated as to depth inward from the outer wall, so as to distribute the air along as between said pipes E and promote a uniform circulation of air in said chamber C. The top or roof of the drier chamber is built highest in the middle and slopes downward to either side like the roof of a house, so that the delivery pipes E are proportionately lower at their outer ends than at their inner ends and deliver the air through elbows at their ends directly into the ventilating spaces 2.

Obviously from the foregoing it will be seen that the air is intended to distribute laterally into the body of the drying chamber upon reaching side spaces 2, and being driven in by means of blower or fans it is forced to circulate through said chamber and absorb the moisture from the otherwise green or wet veneer passing through the chamber in the opposite direction and exposed to the air in its entire travel.

F represents an inner supporting frame, which may have any suitable open work construction adapted to carry the rollers R which convey the veneer. These rollers are disposed in pairs at successive elevations vertically, Fig. 5, and in series horizontally, so that a strip or sheet of veneer can be started in the first set of rollers at the left of the machine over feed rolls $a$ on any one of the five different levels or series shown and feed automatically through the machine from one set of rolls to the other successively. A given series of rolls on any one of the successive elevations will carry the veneer the same as upon an endless apron or belt, as seen in Fig. 6, and the said sets of rolls are near enough together in the direction of travel to prevent undue sagging of the veneer between them. Suitable gears 5 or their equivalent are employed on the journals or shafts of said rolls to actuate the same. As to this I do not limit myself to any particular power or driving connection, and all the series of rolls are intended to work in unison and to travel at such rate of speed as will acceptably dry the veneer in a single passage through the machine. Gear connection with one roll of a pair will suffice to drive both by coöperation of the intervening veneer, and said rolls or rollers are journaled in frame F.

The air supplied to the machine through tube D is preferably heated to a suitable temperature and this is supplemented by steam pipes 10 running lengthwise of the machine between sets or series of rolls R and connected with headers 12 at their respective ends for supply and exhaust of steam respectively.

In the nature of things there will be a large volume of moisture cast off in the drying operation, and the same is drawn off by drain or exhaust tubes 14 located on opposite sides at the bottom of the side ventilating spaces 2, and fed through down pipes 15 at intervals which drain the moisture into said tubes 14 whence it is carried off through stack or exhaust flue 16, which may have a suction fan or blower if necessary.

The travel of the heated air through the drier is in inverse direction to the travel of the veneer so as to insure the best possible results, and the volume of air can be governed to suit the demands of the work and the speedy or rapid elimination of liberated moisture. Hence by this system of ventilation or handling of the drying agent, which is the air, I am enabled to dry the same quantity of veneer in approximately half the time required by any other machine above referred to. The material difference lies wholly in the present method of ventilation or air control as compared with old methods. As to the carrier mechanism, it is immaterial whether feed rollers R be used or the endless carriers D of my old machine, or as in Fig. 6. In fact both rollers and endless carriers are old in this art and are used interchangeably and hence are not claimed herein as such. However a novel feature is shown in connection with the endless carriers D' shown in Fig. 6, in that I arrange a pair of straightening rolls $d$ in the space between successive sets of said carriers, so that as the veneer is delivered by one set to another set in the same line it passes between the said rolls $d$ and is straightened out thereby. In this connection it should be stated that veneer has a tendency to warp or curl as it passes through the machine and especially when carried on endless carriers, and rolls or rollers $d$ are found really necessary at intervals to straighten out the veneer as the drying proceeds so that it will be delivered straight and flat when it reaches the end of the machine. Of course the tendency to warp is taken care of by the rolls R themselves when such rolls are used.

What I claim is:

1. A veneer drying machine having a main ventilating flue lengthwise in the top thereof and branches at intervals therefrom on each side, and ventilating spaces along the sides of the machine into which said branches discharge.

2. A veneer drying machine provided with a drying chamber and ventilating spaces along the sides of said chamber, a flue centrally over the top of said chamber and branch pipes at intervals from said flue discharging into said ventilating spaces, and exhausts from said chamber at the bottom of said spaces.

3. A veneer drying machine have a central drying chamber and side ventilating spaces open thereto, an air supply flue centrally over said chamber and downwardly inclined ducts therefrom at intervals on both sides discharging into the top of said ventilating spaces, and valved exhausts at intervals from the bottom of said ventilating spaces.

4. A veneer drying machine having a drying chamber lengthwise, ventilating spaces at its sides provided with vertically disposed vanes at intervals, in combination with means to distribute heated air at intervals from the top in said ventilating spaces and means at intervals to withdraw the moisture laden air from the bottom of said chamber and an exhaust stack into which said air is discharged.

5. A veneer drying machine having ventilating spaces at its sides, an air supply flue and ducts therefrom discharging the air into the said ventilating spaces, exhaust ducts at intervals from the said ventilating spaces and exhaust passages into which said ducts discharge.

In testimony whereof I affix my signature in presence of two witnesses.

FRANK N. MOREY.

Witnesses:
E. M. FISHER,
F. C. NUSSUN.